US006968195B2

(12) United States Patent
Nowak

(10) Patent No.: US 6,968,195 B2
(45) Date of Patent: Nov. 22, 2005

(54) ENHANCED PDE SELECTION

(75) Inventor: Steven P. Nowak, Superior, CO (US)

(73) Assignee: Openwave Systems Inc., Redwood City, CA (US)

( * ) Notice: Subject to any disclaimer, the term of this patent is extended or adjusted under 35 U.S.C. 154(b) by 526 days.

(21) Appl. No.: 10/071,117

(22) Filed: Feb. 7, 2002

(65) Prior Publication Data

US 2002/0123354 A1 Sep. 5, 2002

Related U.S. Application Data

(63) Continuation-in-part of application No. 09/796,972, filed on Mar. 1, 2001, now Pat. No. 6,757,545.

(51) Int. Cl.⁷ ............................................... H04Q 7/20
(52) U.S. Cl. ............................... 455/456.2; 342/357.01
(58) Field of Search ........................ 455/456.1, 456.2, 455/404.2, 422.1, 433, 456.5, 517; 342/357, 342/450, 457, 357.01, 357.02, 357.03, 357.04, 342/357.08, 357.09, 357.1, 357.12, 357.13

(56) References Cited

U.S. PATENT DOCUMENTS

| 5,208,756 | A |   | 5/1993  | Song ........................... 364/449 |
|-----------|---|---|---------|------------------------------------------|
| 5,218,367 | A |   | 6/1993  | Sheffer et al. ............... 342/457    |
| 5,577,100 | A |   | 11/1996 | McGregor et al. ............. 379/58     |
| 5,721,678 | A |   | 2/1998  | Widl ...................... 364/424.04   |
| 5,767,788 | A |   | 6/1998  | Ness ....................... 340/825.49  |
| 5,774,802 | A |   | 6/1998  | Tell et al. ................... 455/408  |
| 5,787,354 | A |   | 7/1998  | Gray et al. ................. 455/456    |
| 5,832,381 | A | * | 11/1998 | Kauppi ..................... 455/432.1   |
| 5,884,221 | A |   | 3/1999  | Wortham .................... 701/300     |
| 5,926,133 | A |   | 7/1999  | Green, Jr. .................... 342/363  |
| 6,212,391 | B1 |  | 4/2001  | Saleh et al. ................. 455/456   |
| 6,212,392 | B1 |  | 4/2001  | Fitch et al. ................. 455/456   |
| 6,249,252 | B1 |  | 6/2001  | Dupray ....................... 342/450   |
| 6,256,504 | B1 |  | 7/2001  | Tell et al. ................... 455/457  |
| 6,282,427 | B1 |  | 8/2001  | Larsson et al. ............. 455/456     |
| 6,289,279 | B1 |  | 9/2001  | Ito et al. ..................... 701/213 |
| 6,300,904 | B1 |  | 10/2001 | Dvorak et al. .............. 342/457     |
| 6,321,092 | B1 |  | 11/2001 | Fitch et al. ................. 455/456   |
| 6,330,452 | B1 |  | 12/2001 | Fattouche et al. .......... 455/456      |
| 6,347,228 | B1 |  | 2/2002  | Ludden et al. .............. 455/456     |
| 6,680,998 | B1 | * | 1/2004 | Bell et al. ..................... 379/37 |

FOREIGN PATENT DOCUMENTS

WO          WO 00/04730          1/2000

(Continued)

Primary Examiner—Quochien B. Vuong
(74) Attorney, Agent, or Firm—Townsend and Townsend and Crew LLP

(57) ABSTRACT

A method and apparatus for managing the selection of location information sources (e.g., position determining equipment sites) to provide location information for a mobile communications unit (e.g., a cellular phone) are disclosed. Embedded within a request for location information on a particular mobile communications unit are one or more specifications regarding the quality of the requested location information. Such specifications is used to determine if any location information sources are able to provide the location information with the desired location information quality. Upon locating a location information source capable of providing the requested location information, the source is invoked to the particular location information source. Once the location information is provided by the location information source it is provided to the requesting party.

42 Claims, 6 Drawing Sheets

FOREIGN PATENT DOCUMENTS

| WO | WO 00/27143 | | 5/2000 |
| WO | WO 01/26393 | A1 | 4/2001 |
| WO | WO 01/33825 | A1 | 5/2001 |
| WO | WO 01/35683 | A1 | 5/2001 |

\* cited by examiner

Figure 4. PDE site Database 62

| Record | PDE Site 70 | PDE Type 74 | Physical Location 78 | Coverage Area 82 | Determining Accuracy 86 | Computational Speed 90 | Cost 94 | Handset Based 96 | Extra 98 |
|---|---|---|---|---|---|---|---|---|---|
| 66a | | | | | | | | | |
| 66b | | | | | | | | | |
| 66c | | | | | | | | | |
| 66d | | | | | | | | | |

Figure 5 Cell/PDE Database 72

| Cell/ Cell Sector 77 | Available PDE Sites 70a | Available PDE Sites 70b | Available PDE Sites 70n |
|---|---|---|---|
| 75a | | | |
| 75b | | | |
| 75c | | | |
| 75d | | | |

Figure 6 HLR Database 100

| Record | Mobile Unit 108 | Subscriber Address 116 | Subscriber Name 112 | PDE Capabilities 116 | Physical Location Info 124 | Physical Location Time 128 |
|---|---|---|---|---|---|---|
| 104a | | | | | | |
| 104b | | | | | | |
| 104c | | | | | | |

Figure 7 System/PDE Capabilities 200

| PDE Type 204 | Average Determination Accuracy 206 | Average Response Time 210 | Average Cost 212 | 'N' Attributes 214 |
|---|---|---|---|---|
| PDE Type 1 | | | | |
| PDE Type 2 | | | | |
| PDE Type N | | | | |

ENHANCED PDE SELECTION

CROSS-REFERENCE TO RELATED APPLICATIONS

This application is a continuation in part of U.S. patent application Ser. No. 09/796,972, filed Mar. 1, 2001 which is entitled "Location Information Management System and Method for Mobile Communications Unit" which is now U.S. Pat. No. 6,757,545, the entire disclosure of which is incorporated by reference herein in its entirety.

FIELD OF THE INVENTION

The present invention generally relates to the use of position determination equipment (PDE) in relation to a mobile communications system (e.g., a wireless network) and, more particularly, to selecting a PDE according to specifications in a location information request for a mobile communications unit.

BACKGROUND OF THE INVENTION

Wireless communications networks generally allow for voice and/or data communication between wireless stations, e.g., wireless telephones (analog, digital cellular and PCS), pagers or data terminals that communicate using RF signals. In recent years, a number of location based service systems have been implemented or proposed for wireless networks. Such systems generally involve determining location information for a wireless station and processing the location information to provide an output desired for a particular application.

Examples of such existing or proposed applications include emergency or "911" applications, location dependent call billing, cell-to-cell handoff and vehicle tracking. In 911 applications, the location of a wireless station is determined when the station is used to place an emergency call. The location is then used to route the call and, perhaps, is transmitted to a local emergency dispatcher to assist in responding to the call. In typical location dependent call billing applications, the location of a wireless station is determined, for example, upon placing or receiving a call. This location is then transmitted to a billing system that determines an appropriate billing value based on the location of the wireless station. In handoff applications, mobile unit location is determined in order to coordinate handoff of call handling between network cells. Vehicle tracking applications are used, for example, to track the location of stolen vehicles. In this regard, the location of a car phone or the like in a stolen vehicle can be transmitted to the appropriate authorities to assist in recovering the vehicle.

From the foregoing, it will be appreciated that location based service systems involve position determination equipment (PDE) and location-related applications. To some extent, the PDEs and applications have developed independently. In this regard, a number of types of PDEs exist and/or are in development. These include so-called angle of arrival (AOA) time difference of arrival (TDOA), handset global positioning system (GPS) and the use of cell/sector location. The types of equipment employed and the nature of the information received from such equipment vary in a number of ways. First, some of these equipment types, like GPS, are generally wireless station-based whereas others are "ground-based," usually infrastructure-based. Some can determine a wireless station's location at any time via a polling process, some require that the station be transmitting on the reverse traffic channel (voice channel), and others can only determine location at call origination, termination, and perhaps registration. Moreover, the accuracy with which location can be determined varies significantly from case to case. Accordingly, the outputs from the various PDEs vary in a number of ways including data format, accuracy and timeliness.

The nature of the information desired for particular applications also varies. For example, for certain applications such as 911, accuracy and timeliness are important. For the applications such as vehicle tracking, continuous or frequent monitoring independent of call placement is a significant consideration. For other applications, such as call billing, location determination at call initiation and call termination or during handoff is generally sufficient.

Heretofore, an incoming position request has only been able to limit the location information provided by the PDEs to a maximum allowable uncertainty and/or location information no older than a specified value. This has not always resulted in the most efficient use of PDEs in a mobile communications system or resulted in the best use of available resources for a particular wireless location application. For example, some applications such as 911 may desire/require the most current location information with the highest level of geographical accuracy. In contrast, the needs of other applications such as a fleet tracking system may be met by using less current and/or less geographically accurate location information.

SUMMARY OF THE INVENTION

The present invention provides a method and apparatus for use in a mobile communications location information management system to select at least a first position determining equipment source to provide location information regarding a mobile communications unit such as a cell phone in a mobile communications system. More particularly, the method provides for selecting a position determining equipment (hereinafter "PDE") source from a plurality of PDE sources that are capable of providing location information. The method comprises the steps of: receiving a request for location information for the desired mobile communications unit, where the request includes at least one specification regarding the location information; selecting one PDE source from the plurality of PDE sources based on the specifications; obtaining location information from that PDE source for the desired mobile communications unit (hereinafter "MCU"); and directing the location information to a location associated with the request (e.g., the requesting parties). The corresponding apparatus of the present invention includes ports for communicating with the requesting party and PDE sources (or a source gateway) and a processor for implementing PDE selection logic as described below. The invention allows a requesting party to request location information that is specifically tailored to its needs, for example, a requesting party which requires highly accurate geographical information, such as 911 services, are able to request location information from the PDE sources with the highest "granularity" (i.e., highest resolution) in the system. In contrast, requesting parties with lower quality needs may be able to request location information that has less geographical granularity, which may be older and have a lower cost to the requesting party. Alternatively, in the case where multiple sources of sufficient information are available, a PDE source may be selected on other bases.

The request will generally contain a number of fields that correspond to various prerequisites and requirements for location information. In particular, the request will generally contain some sort of identifier such that the MCU to which the location information request is being made may be identified. Additional fields may be provided such that in accordance with the present invention, the request may include one or more requirements or prerequisites related to the desired location information. This may be characterized as a "quality of service" (QoS) parameter and the interactive process between the requesting party and a Location Information Management System for QoS determination may be deemed a QoS negotiation. Each of these QoS parameters may be evaluated individually or in combination to determine if any PDE sources will be able to provide location information for the MCU in accordance with these parameters. Additionally, some of these QoS parameters may be specified relative to predefined ranges. For example, a client may be able to request location information for a particular MCU where that information has an accuracy or uncertainty within a specified range. Prior to the request, the client application may know the accuracies associated with each range category. The client may know, for example, that it can request low, medium or high accuracy location information which corresponds to, for example, an accuracy or uncertainty of 700 meters, accuracy between 300 and 700 meters, and accuracy less than 300 meters, respectively. However, it will be appreciated that any number of value ranges, such as ranges 1–N, may be used and that each range may be assigned different accuracy values.

The QoS parameters that may be specified in the request may, in addition or as an alternative to geographical accuracies, include other specifications. These specifications may include designation of an acceptable level of cost associated with the location information, requirements to an acceptable range of ages for the location information and/or a requirement related to a range of acceptable response times to receive the location information. With respect to the cost requirement, the request may be made such that location information up to, but not more than, a certain cost is authorized. With respect to the allowable range of age for the location information, it will be appreciated that, often, some sort of location information is available without requesting a new PDE source to initiate location sequence. For example, if an MCU has been located recently, that information may be stored in one or more databases within a mobile communications system. In this instance, the database may be considered a PDE source. Therefore, in some instances, it is possible to retrieve location information without utilizing PDE sources that require a network location search. However, this information may be outdated for some purposes. In this regard, the specification of the allowable age of the requested location information may specify that the location information may not be older than a certain age. Again, this allows location-based applications to specifically tailor the requested location information to their needs. Likewise, the acceptable response time may be defined in a range of values such that time dependent applications, such as 911, may request location information with response time less than X. In this instance, the Location Information Management System may operate such that it provides the best location information available at the end of the specified response time. For example, if the response time is not greater than a specified time and the only information that the Location Information Management System can provide in that time is cell/sector location information, then cell/sector location will be provided.

In addition or in alternative to specifications that allow a user to specify a range of limitations related to location information, the specification in the request may include instructions on how the Location Information Management System is to operate. For example, the requirement may have a priority field that determines how the Location Information Management System will process the request. For example, in the case of emergency service such as 911, there may be a field in the request that specifies highest priority. This highest priority could be a last in, first out command which instructs the Location Information Management System to process the request as soon as it is received, in front of other requests in the queue, thus altering the general first in, first out operation of the system. Another requirement that may be utilized with this present invention is a specification for the Location Information Management System to use a particular type of position determining equipment source to provide the desired location information. For example, a requesting party may specify that the location information is to come from a TDOA PDE source in the network or, alternatively, it may specify for a particular geographically situated PDE site to provide the location information.

The step of receiving may further involve processing the specification information of the various fields of the location information request for use with the Location Information Management System. For example, a specification within the request may have to be correlated with values relating to certain aspects related to the PDE sources. For instance, where the Location Information Management System operates with a PDE carrier system which employs three different types of PDE sources (e.g., cell/sector, TDOA, AGPS) which provide varying accuracies of location information, a geographical specification in the request (e.g., low, medium, high) may be correlated to a particular type of PDE sources (low=cell/sector, medium=TDOA, high= AGPS). As will be appreciated, the various requirements in the location information request may be correlated with various PDE source variables that correspond with the requirements. Further, the requesting party may know the general range of what they are requesting, however, they may not know how the Location Information Management System correlates their request to the PDE sources. For example, in one embodiment, the Location Information Management System may correlate the specifications in the request to individual PDE sources in the mobile network or to hybrid information obtained by combining information obtained from multiple sources. In this case, the Location Information Management System may consult a database in which information regarding the determining abilities of the PDE sources is stored. After consulting this database, the Location Information Management System may correlate the requirements in the request to the individual PDE sources or hybrid information. Alternatively, the Location Information Management System may correlate the requirements in the request to average values within the PDE source network. For example, in a network using three types of PDE sources, the average accuracy values of each of these sources may be stored in, for example, a database record providing an average value for each source relating to each QoS parameter that may be specified in a request. In this regard, it will be appreciated that information from a particular source, such as TDOA, may be provisioned by multiple sites having varying accuracies.

Once the requirements within the location information request have been correlated to PDE values, the Location Information Management System can select a PDE source to provide the desired location information. Generally, the determination of which PDE source, if any, would be able to provide location information on an MCU in accordance with the requirements in the location information request may entail consulting a database or other appropriate data storage structure having information on these PDE sources. Various types of information may be stored on each PDE source or on the average capabilities of the multiple PDE sources within a given PDE network. Typically, the information will include an identifier that is unique to each particular PDE source or type of PDE in the network, followed by other information relating to the PDE sources' characteristics, which may be correlated with various QoS parameters. For example, a geographical description of the coverage area may be defined for each PDE source, the response time for each PDE source, costs associated with each PDE source, whether the PDE source works with handset based location finding technologies, etc. The Location Information Management System of the present invention will then begin to eliminate those PDE sources that do not comply with the requirements of the location information request or otherwise identify any suitable PDE or PDEs. For example, if the request indicates that location information must be obtained with a cost of no more than X, all the PDE sources with a cost basis higher than X will be eliminated from consideration. Thus, if a particular PDE source cannot provide location information on a particular MCU with the required QoS parameters, this particular PDE source will not be considered to provide location information. Though discussed in reference to eliminating PDE sources from consideration, the present invention may also be utilized to affirmatively select only those PDE sources that meet the QoS parameters for consideration.

With regard to the selection process, there is an important distinction as to if or when a general location of the MCU is known. In the case where a location information request contains a general location of the MCU for which information is desired or such general location is otherwise available, the Location Information Management System may be able to select individual sites of a PDE source. In this case, the Location Information Management System may consult a database record using the general location information to determine individual PDE sources able to provide location information for part of or, preferably, all of the general location where the MCU unit is located. Once this is completed, a list of PDE sources able to provide location information for the general location of the MCU is provided. Typically, this list will contain a PDE source identifier that may be used to search another database or relational database table such that the individual characteristics (which may be correlated with QoS parameters) of the PDE sources may be determined. Again, the Location Information Management System may compare the correlated requirements from the location information request to the corresponding parameters within the PDE source records, eliminating those that cannot provide location information within the specified parameters.

In the situation where the general location of the mobile communications unit is not provided, the Location Information Management System may use network-based averages to select a PDE type that may be used to provide location information. In this regard, information regarding each type of PDE available (AOA, TDOA, AGPS, etc.) may be stored as a record in a database and contain a listing of the average values for each of the characteristics associated with the PDE sources. For example, it may be known that AOA systems within the PDE source network provide, on average, location information within X meters of the MCU location with a response time of Y and a cost of Z. Therefore, when the general location information of the MCU is not included in the request, the Location Information Management System may select a type of PDE source from the database record which have network average values that correspond with the requirements of the location information request. The Location Information Management System may then send a request to another platform in the mobile communications network to provide the location information from the selected type of PDE, as will be more fully discussed below.

Often, only one PDE source will be able to provide the location information requested in accordance with the requirements in a location information request. This is especially likely when there are multiple requirements within the request. However, in some cases, multiple PDE sources may be determined to be available or appropriate for providing location information on a particular MCU (i.e., multiple PDE sources satisfy all the requirements associated with the request for location information on a particular MCU). This may occur, for example, where the only requirement is location information with a cost less than X. In this instance it may still be desirable to only receive location information from a single source; therefore, the remaining PDE sources may be further limited, using some secondary consideration. For example, the first PDE source on the list may be chosen or some secondary QoS specification, such as speed of processing, may be chosen as a default to further limit the number of PDE sources until only one remains. Alternatively, there may be a client profile database that specifies a particular client's preferences as to secondary considerations.

Alternatively or additionally, such PDE selection may be based at least in part on a business rule set. In this regard, a set of rules or an algorithm may be provided for a particular operator, application or the like. For example, the algorithm may specify that, if a particular PDE source is available for the subscriber and/or network area, then that PDE should be utilized. The algorithm may further specify that if the first preferred source is not available then a second identified source should be used if available and so on. Similarly, a location based billing application may specify that CellID information should be used for ongoing monitoring of a subscriber's location until CellID information becomes inadequate to determine whether, for example, the subscriber is inside or outside of a "home zone." More complex algorithms could specify different sources, accuracies, timeliness, etc. under different conditions or at different times. Such algorithms could be executed by an application or in connection with a gateway or other location platform. In the context of a defined interface for requesting location information, the algorithm could instruct the location platform to ignore attributes specified in the location request or the algorithm could be applied with respect to attributes not populated.

The step of obtaining location information from the selected PDE source may vary depending on what information was used to select the PDE source. In the case where the general location information of the MCU was known, individual PDE sources may have been identified such that a request may be sent directly to such sources for the location information. In contrast, where the general location of the MCU was not known during the selection process, a request may be sent to a platform within the PDE network requesting a certain type of PDE source be used to provide the information. In this case, the PDE network may determine which individual source is in the proximity of and able to provide location information for the MCU, e.g., based on separately obtained general location information, e.g., cell or cell sector information. As will be appreciated, the PDE network is generally in communication with the mobile communications network. As such, the PDE network may have the ability to determine a general location of the MCU within the mobile network. For example, when the MCU is being powered or is in an "on" condition, one or more signals will be exchanged on some basis (e.g., intermittently, periodically) between the MCU and cell site equipment in the area in which the MCU is then physically located. This information may be stored, for example, in a home location register ("HLR"), visitor location register ("VLR") or some other storage means within the network. The PDE network in this case will determine the general location of the MCU and invoke the proper PDE source in proximity of the MCU to provide location. In either case, once the location information is determined by the PDE source, it is returned to the Location Information Management System where it may then be returned to a party associated with the incoming request or other designated location. For example, the incoming request may provide instructions on where the location information is to be sent or the location information may be sent directly back to where the location information request originated from.

Finally, in the case where no PDE sources are able to provide location information in accordance with the specifications in the request, the Location Information Management System may be configured to return some sort of error message indicating that the system is unable to provide the location information to the desired specifications.

BRIEF DESCRIPTION OF THE SEVERAL VIEWS OF THE DRAWING

FIG. 4 illustrates an embodiment of a position determination equipment site database structure that may be utilized by the location information management system of FIG. 1;

FIG. 5 illustrates an embodiment of a cell/position determination equipment site database structure that may be utilized by the location information management system of FIG. 1;

FIG. 6 illustrates an embodiment of a home location register database structure that may be utilized by the location information management system of FIG. 1;

FIG. 7 illustrates an embodiment of a system/position determination equipment capabilities database structure that may be utilized by the location information management system of FIG. 1;

DETAILED DESCRIPTION OF THE INVENTION

Figure 1:
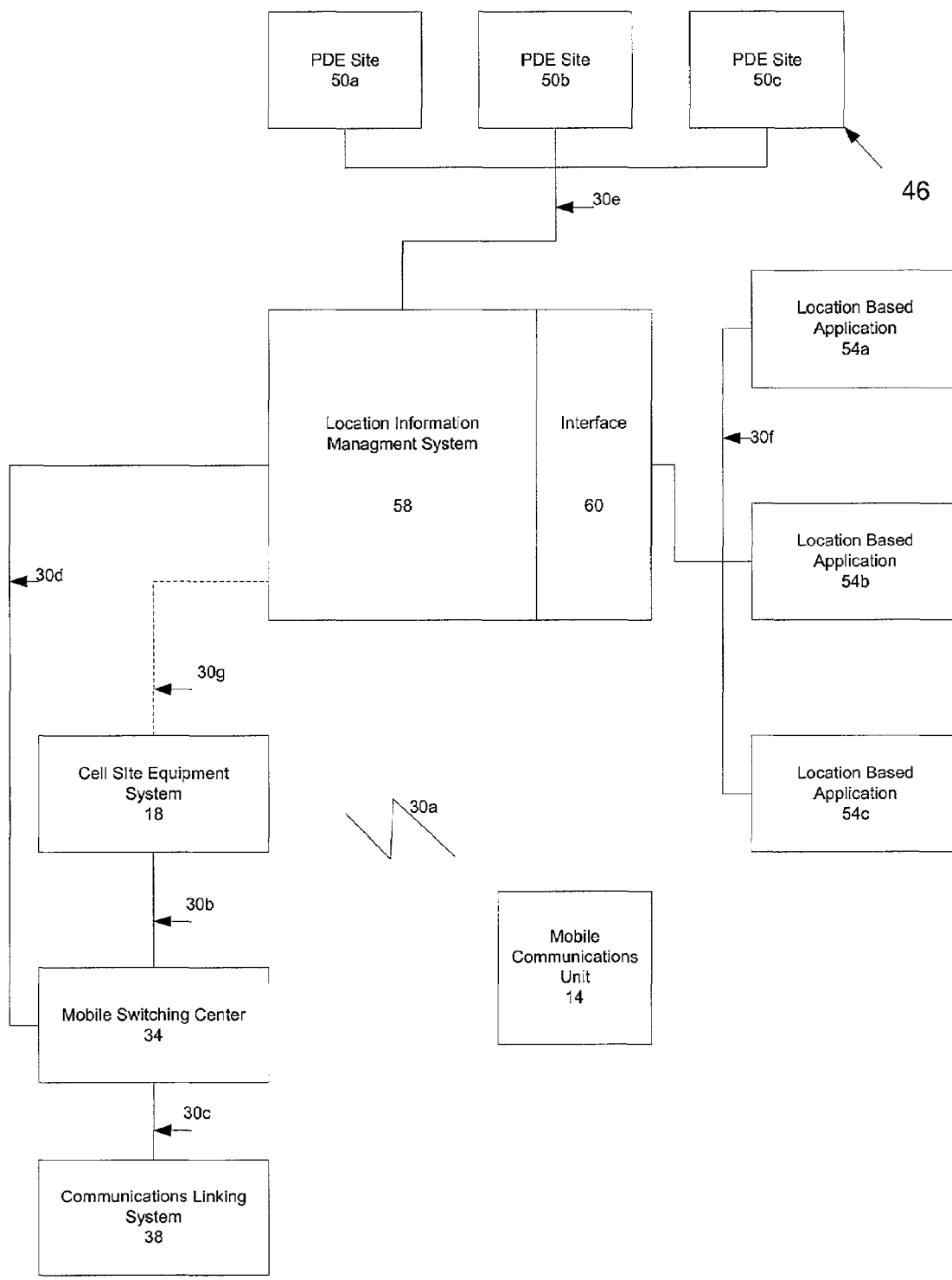
FIG. 1 is a schematic representation of an embodiment of a mobile communications system which includes or which interfaces with a location information management system in accordance with the present invention.
Figure 2:
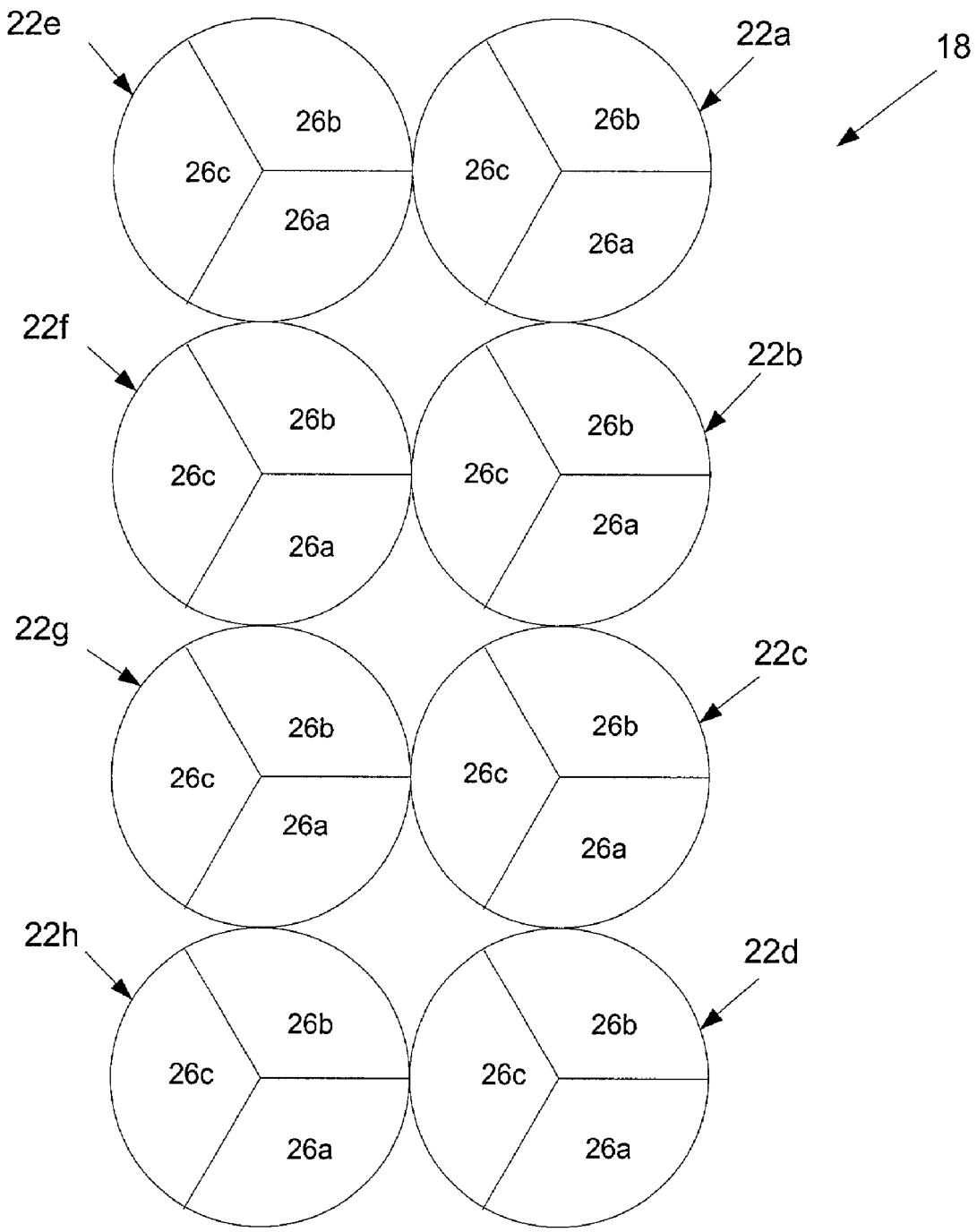
FIG. 2 is one embodiment of a cell/sector structure that may be utilized by the mobile communications system of FIG. 1.

One embodiment of a mobile or wireless communications network or system 10 is presented in FIG. 1. The mobile communications system 10 includes at least one Mobile Communications Unit 14 (e.g., a cellular phone) which communicates with a cell site equipment system 18 by an appropriate communications link 30a i.e., an RF link. A portion of this cell site equipment system 18 together with associated coverage areas is illustrated in FIG. 2. The cell site equipment system 18 of FIG. 2 includes a plurality of cells 22a–h. Each cell 22a–h includes a plurality of cell sectors 26a–c. Each cell 22a–h and its various cell sectors 26a–c cover a certain geographical area. At least one transmitter and at least one receiver (or a "transceiver"), as well as at least one antenna (all not shown), are associated with each cell sector 26a–c for handling all communications involving any Mobile Communications Unit 14 that is physically located within or possibly in proximity to the particular cell sector 26. Typically a single directional antenna will be utilized by each cell sector 26 in the type of configuration presented in FIG. 2, and the coverage area of the antennas in a given cell 22 will overlap to a degree. Although each of the cells 22 and cell sectors 26 are illustrated in FIG. 2 as being of the same size and configuration, such need not be the case in relation to the functionality of a Location Information Management System 58 which is part of or at least operatively interfaces with the mobile communications system 10, and which is discussed in more detail below. Moreover, adjacent cells 22 may be disposed in overlapping relation without adversely affecting the functionality of the Location Information Management System 58.

An appropriate communications link 30b operatively interconnects the cell site equipment system 58 with a mobile switching center 34 as illustrated in FIG. 1. The mobile switching center 34 in turn is operatively interconnected with a communications linking system 38 (e.g., a telephone company central office, one or more central switching offices) by an appropriate communications link 30c. Communications involving the Mobile Communications Unit 14 are thereby directed through the cell site equipment system 18, the mobile switching center 34, and communications linking system 38 to the other device(s) involved in the subject communication. Any way of providing communication capabilities between a given Mobile Communications Unit 14 and another communication device may be employed without adversely affecting the functionality of the Location Information Management System 58.

The Location Information Management System 58 may be directly operatively interconnected with the mobile switching center 34 by an appropriate communications link 30d, and may be directly operatively interconnected with the cell site equipment system 18 by an appropriate communications link 30g (as indicated by the dashed line in FIG. 1), or both. Any way of integrating the Location Information Management System 58 with the mobile communications network or system 10 may be utilized, including such that the Location Information Management System 58 is part of the system 10 or separate therefrom. Multiple components are part of or interface with the Location Information Management System 58 in relation to communications involving any Mobile Communications Unit 14 of the mobile communications system 10 (e.g., communications being directed through the mobile switching center 34). These components may either be part of or separate from the mobile communications system 10. One such component is a position determination equipment system 46 that is operatively interconnected with the Location Information Management System 58 by an appropriate communications link 30e. The PDE system 46 generally provides a source to determine the location of a particular Mobile Communications Unit 14. In this regard, the illustrated PDE system 46 generally includes a plurality of PDE sites 50a–c that may be located at various physical locations throughout the mobile communications system 10. Any technology which is appropriate for determining the location of a given Mobile Communications Unit 14 may be employed at any given PDE site 50. As used herein, a PDE source is used to discuss any source able to provide location information, such as a database and/or PDE sites 50, whereas a PDE site 50 generally entails a fixed network structure for providing location information. Representative examples of position determination technologies which are appropriate for the position determination equipment system 46 include GPS-based technologies, cell sector or micro-cell location technologies, time difference of arrival (TDOA) technologies, angle of arrival (AOA) or other network triangulation technologies, and enhanced observed time difference (EOTD), and TOA or network assisted GPS. It will be appreciated that these technologies may be handset based, network based or network overlay technologies.

The illustrated position determining system includes sites 50a, 50b and 50c, may operate separate from the MSC 34 and may include network based systems, (e.g., AOA and TDOA systems), and external systems such as GPS. Generally, the illustrated network based system such as AOA and TDOA systems determine the location of a Mobile Communications Unit 14 based on communications between the Mobile Communications Unit 14 and the cell site equipment system 18. For example, such systems may receive information concerning a directional bearing of the Mobile Communications Unit 14 or a distance of the Mobile Communications Unit 14 relative to each of multiple cell sites 22 or other sites. Based on such information, the location of the Mobile Communications Unit 14 can be determined by triangulation or similar geometric/mathematic techniques. External systems such as GPS systems, determine the Mobile Communications Unit's location relative to an external system. In the case of GPS systems, the Mobile Communications Unit 14 is typically provided with a GPS receiver for determining geographic position relative to the GPS satellite constellation. This location information is then transmitted across an air interface to the network 10.

As noted, the network 10 further includes a cell site equipment system 18 for communicating with the Mobile Communications Unit 14. In this regard, the cell site equipment system 18 may include three or more directional antennas for communicating with Mobile Communications Units within subsections of the cell area. These directional antennas can be used to identify the subsection of a cell where the Mobile Communications Unit 14 is located. In addition, ranging information obtained from signal timing information may be obtained to identify a radius range from the cell site equipment where the Mobile Communications Unit 14 is located, thereby yielding a Mobile Communications Unit 14 location in terms of a range of angles and a range of radii relative to the cell site equipment. This cell/sector location information can be transmitted to the Location Information Management System 58 via an appropriate communications link. Therefore, the cell site equipment system 18 may also be characterized as a PDE source. Additionally, inputs from multiple sources may be combined to yield location information as described in U.S. Pat. No. 6,321,092, which is incorporated herein by reference.

Figure 3:
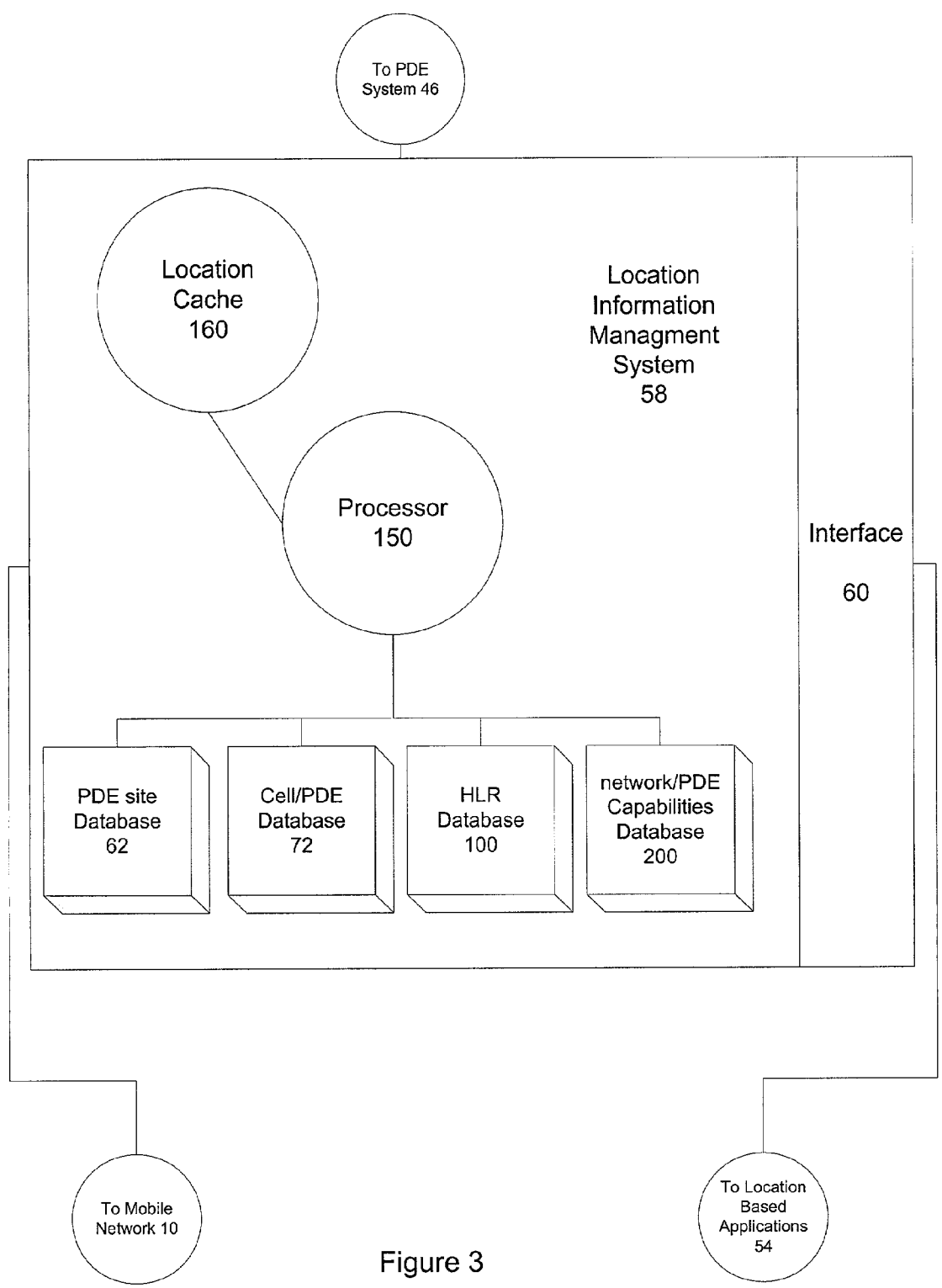
FIG. 3 is a schematic representation of the location information management system of FIG. 1.

Another component that is operatively interconnected with the Location Information Management System 58 by an appropriate communications link 30f is one or more location based applications 54. Location information regarding a particular Mobile Communications Unit 14 may be desired or required by each of these location based applications 54. Requests for location information from any of the location based applications 54 are managed by the Location Information Management System 58. Although the mobile communications system 10 has been described in accordance with the foregoing structure, the functionality of the Location Information Management System 58 may be integrated in the mobile communications system 10 in any appropriate manner. For instance, the Location Information Management System 58 may be readily adapted for any way of routing mobile or cellular communications without affecting operation of the present invention. As shown in FIG. 3 the location-based applications 54 are interconnected to the Location Information Management System 58 through an interface 60. The interface 60 allows location-based applications 54 to selectively access or request information from the Location Information Management System 58. The interface 60 provides a standardized format for submitting location requests to the Location Information Management System 58. This format may include a number of defined fields as will be discussed in more detail below. In this manner, the applications 54 can make use of the best or most appropriate location information available from any PDE source without concern for PDE-dependent data formats or compatibility issues. Moreover, new position-determining technologies can be readily incorporated into the wireless system 10 and used by the applications 54 without significant accommodations for the existing applications 54, as long as provision is made for providing data to the Location Information Management System 58 in a standardized format.

The interface 60 allows the applications 54 to include in a location request for a particular Mobile Communications Unit 14, one or more specifications or "Quality of Service" (QoS) parameters in one or more fields regarding desired location information. These QoS parameters are related to the information provided by various PDE sites 50 in the mobile communication system 10. The PDEs 50a–c may provide location information in various forms; therefore, the illustrated Location Information Management System 58 is capable of correlating the QoS parameter from the fields of the request with the location information provided by a particular PDE site 50, as will be more fully discussed below.

The interface 60 allows the location-based applications 54 to include at least a first QoS parameter with a request regarding the location information for the desired Mobile Communications Unit 14. For example, the QoS parameter may include one or more of the following: maximum allowable age of the location information, the geographical accuracy of the information, the cost of the information, response time required to produce the information, priority of processing for the information, and even specifying which type of PDE source will provide the information. More particularly, in accordance with the present invention, some of the QoS parameters and, in particular, geographical accuracy, cost, and response time may be divided into a selectable range of values that will be used by the Location Information Management System 58 to select a PDE source or site and provide location information. This enables the Location Information Management System 58 to provide location information regarding a particular Mobile Communications Unit 14 specifically 'tailored' to a location based application's request and thus eliminate unnecessary invocations of PDE sources. For example, when the QoS parameter within the location based application's request is directed to geographical accuracy of the information, the parameter may be sub-divided into a range of values relating to geographical accuracy such as low, medium and high or, alternatively, any number of accuracy ranges 1–n. These parameter values may then be used by the Location Information Management System 58 to limit selection of PDE sites 50 to those sites that are able to provide information in accordance with the specified parameters of the location information request.

The interface may be configured to translate the specified range to a numerical or other convenient value for comparison with attributes in the PDE database record. This configuration makes it possible to revise the range of the specification as system capabilities increase. For example, as improvements to geographical accuracy within the system become available, the interface may be configured such that it is able to receive requests from a client (i.e., application) having a narrower range. In this instance, instead of having low, medium and high geographical accuracy value, it may be possible to have divisions of 1–10. As the granularity of the requirements in the requests increase, the Location Information Management System 58 may be configured to combine or aggregate the abilities of one or more PDE sites 50 to provide location information having a specified parameter. For example, it may be possible to use two or more PDE sites 50 involving the same or different technologies where neither site contains the specified geographical accuracy or where one or more of the sites provides incomplete information and invoke the combination of the two or more PDE sites 50 to produce the desired geographical accuracy. Thus, where a handset does not have contact with the required number of satellites to provide complete GPS information, partial GPS information may be combined with other location information, e.g., cell sector information, to yield the desired location information.

Where a gross or general location of a Mobile Communications Unit is provided with a location request or otherwise available, the Location Information Management System 58 is operable to identify each PDE site 50 operable to provide location information for that general location. For example, when the cell 22 or cell sector 26 location of a unit 14 is provided or otherwise available, the Location Information Management System 58 may associate such cells 22 and/or cell sectors 26 with those PDE sites 50 that are able to provide location information for units in this particular cell 22 and/or cell sector 26. FIG. 4 presents one embodiment of a PDE site database 62 which may be utilized by the Location Information Management System 58 to determine which PDE sites can provide location information for a particular Mobile Communications Unit 14. The database 62 may reside on an appropriate computer-readable storage medium. The PDE site database 62 may be generally viewed as containing a database record 66 for each PDE site 50 utilized by the Location Information Management System 58. Each record 66 may include some or all of the following types of information regarding various QoS parameters, each of which defines its own separate database field: 1) a PDE site field 70 for storing information which identifies and is unique to the subject PDE site 50; 2) a position determination technology type field 74 for storing information which identifies the type of technology which is utilized by the subject PDE site 50 to provide location information on a Mobile Communications Unit 14; 3) a physical location field 78 for storing information on the physical location of the subject PDE site 50; 4) a coverage area field 82 for storing information that defines the geographical area for which the subject PDE site 50 is able to provide location information on Mobile Communications Units 14 (alone or possibly in combination with information in the corresponding physical location field 78); 5) a position determination accuracy field 86 for storing information which quantifies the accuracy or uncertainty associated with location information on a Mobile Communications Unit 14 which is provided by the subject PDE site 50 or otherwise known; 6) a computational speed field 90 for storing information which quantifies the amount of time required by the subject PDE site 50 to provide location information for a Mobile Communications Unit 14; and 7) a computational cost field 94 for storing information which quantifies the cost for providing location information on a Mobile Communications Unit 14 utilizing the subject PDE site 50. Moreover, other types of information and/or additional QoS parameters may be stored in relation to each PDE site 50, and may then be made available to the Location Information Management System 58. For example, a field may be included which identifies if the PDE site 50 relies upon handset based location technology. As will be appreciated, each record 66 may also contain a blank field 98 such that future modifications to the system may be accommodated. With regard to the coverage area field 82, information contained therein may geographically define the coverage area of the associated PDE site 50. Alternatively, some type of function or parameter may be stored in the coverage area field 82 and which defines the coverage area for the subject PDE site 50 (e.g., information in the coverage area field 82 may be a radius, which when combined with information in the physical location field 78, may be used to define the coverage area of the subject PDE site 50 through an equation for the area of a circle). It will be appreciated that any way of storing the type of information set forth in the PDE site database 62 may be utilized by the Location Information Management System 58. In any case, once the Location Information Management System 58 determines or otherwise receives general location information on a particular Mobile Communications Unit 14 in a manner to be discussed in more detail below, the Location Information Management System 58 may consult the PDE site database 62 to determine if any of the PDE sites 50 stored therein would be able to provide location information on the particular Mobile Communications Unit 14.

FIG. 5 presents an embodiment of a cell/PDE site database 72 which may be utilized by the location information system 58 when a general location of a Mobile Communications Unit 14 is known to determine if location information may be provided on a particular Mobile Communications Unit 14, and which would typically reside on an appropriate computer-readable storage medium. The illustrated cell/PDE site database 72 contains a database record 75 for each cell 22 and/or cell sector 26 that is associated with the Location Information Management System 58. Each record 75 may include one or more of the following types of information, each of which defines its own separate database field: 1) a cell or cell sector field 77 which identifies a particular cell 22 or cell sector 26; and 2) one or more PDE site fields 70, which generally correspond to the PDE site field in the PDE site database and which identify (e.g., via a server address) those PDE sites 50 that are available for providing some sort of location information on a particular Mobile Communications Unit 14 when within the cell 22 or cell sector 26 associated with the particular record 75. Any data storage technique may be utilized, e.g., although the discussion above denotes separate databases, the associated information may be included in or conceptualized as tables of a single relational database. What is of importance is that each cell 22 or cell sector 26 encompassed by the Location Information Management System 58 in the illustrated system be associated with a "list" of PDE sites 50 that would be able to provide location information on a particular Mobile Communications Unit 14 when in this cell 22 or cell sector 26. That is, once the Location Information Management System 58 determines or otherwise receives information on which cell 22 or which cell sector 26 a particular Mobile Communications Unit 14 is currently located in, the Location Information Management System 58 may consult the cell/PDE site database 72 to determine if there are any PDE sites 50 stored in relation to this cell 22 or cell sector 26 so as to be able to provide location information on the particular Mobile Communications Unit 14.

Another source of information that may be utilized by Location Information Management System 58 is a collection of information on each of the various Mobile Communications Units 14 of the mobile communications network 10. One such source is illustrated in FIG. 6 and is in the form of a home location register database 100. As in the case of the PDE site database 62 and the cell/PDE site database 72, the home location register database 100 will typically reside on an appropriate computer-readable storage medium.

The home location register database 100 of FIG. 6 may be generally viewed as containing a database record 104 on each Mobile Communications Unit 14 of the mobile communications system 10. Each record 104 may include one or more of the following types of information, each of which defines its own separate database field: 1) a mobile unit field 108 for storing information which somehow identifies and which is unique to a particular Mobile Communications Unit 14 (e.g., an Electronic Serial Number (ESN)/Mobile Identification Number (MIN), or a telephone number, for the subject Mobile Communications Unit 14); 2) a subscriber name field 112 for storing information which identifies the party that has subscribed to the services provided by the mobile communications system 10 in association with the subject Mobile Communications Unit 14; 3) a subscriber address field 116 for storing information which identifies the address of the party that has subscribed to the services provided by the mobile communications system 10 in association with the subject Mobile Communications Unit 14; 4) a position determination capabilities field 120 for storing information which defines the position determination capabilities of the subject Mobile Communications Unit 14 (e.g., whether the same includes a GPS transceiver or other handset-based location finding capabilities); 5) a physical location field 124 for storing information which identifies the last known physical location of the subject Mobile Communications Unit 14; and 6) a physical location time field 128 for storing information which identifies the time associated with the information contained in the physical location information field 124 (e.g., the physical location information in the field 124 was obtained at a specified time on a specified day in a specified year). It will be appreciated that any way of storing the type of information set forth in the home location register database 100 may be utilized by the Location Information Management System 58. Moreover, other types of information could be stored in relation to each Mobile Communications Unit 14 as well, including further information, which relates to the location information contained in the physical location field 124 (e.g., the accuracy or uncertainty of the specified physical information), and may then be made available to the Location Information Management System 58. The Location Information Management System 58 may consult the home location register database 100 upon receiving a request for location information on a particular Mobile Communications Unit 14 to determine if the particular Mobile Communications Unit 14 itself has location finding capabilities and/or to determine if the last known physical location of the particular Mobile Communications Unit 14 satisfies the outstanding request for location information.

FIG. 7 presents an embodiment of a system/PDE capabilities database 200 which may be utilized by the Location Information Management System 58, when a general location of the Mobile Communications Unit is not provided with the location request or otherwise available. The illustrated system/PDE database 200 contains a database record 204 for each type of PDE technology utilized in the PDE system 46 associated with the Location Information Management System 58. Each record 204 may include one or more of the following types of information, each of which defines its own separate database field: 1) PDE type 206; 2) a system average determination accuracy 208; 3) a system average response time 210; 4) a system average computation cost 212. Each of the entries provides an average value for the particular type of PDE utilized by the PDE system 46. In this regard, if a location information request is received at the Location Information Management System 58 without a general location such that an individual PDE site may not be selected based on that general location, the Location Information Management System 58 may select the type of PDE site 50 in the PDE system 46 that may be utilized to provide the requested information. In this case, the Location Information Management System 58 will produce a request for location information to a platform of the PDE system 46 to locate a particular mobile communication unit 14 using the specified type of position determining equipment. The PDE system 46 then has the responsibility to invoke the designated PDE site 50 covering the area where the Mobile Communications Unit is currently located. As will be appreciated, the PDE system 46 is generally in communication with various components of the mobile network 10 and may therefore be able to determine the mobile communication unit's general location through various known means (e.g., an HLR query, cell identification information messages used for call routing, etc.)

Figure 8:
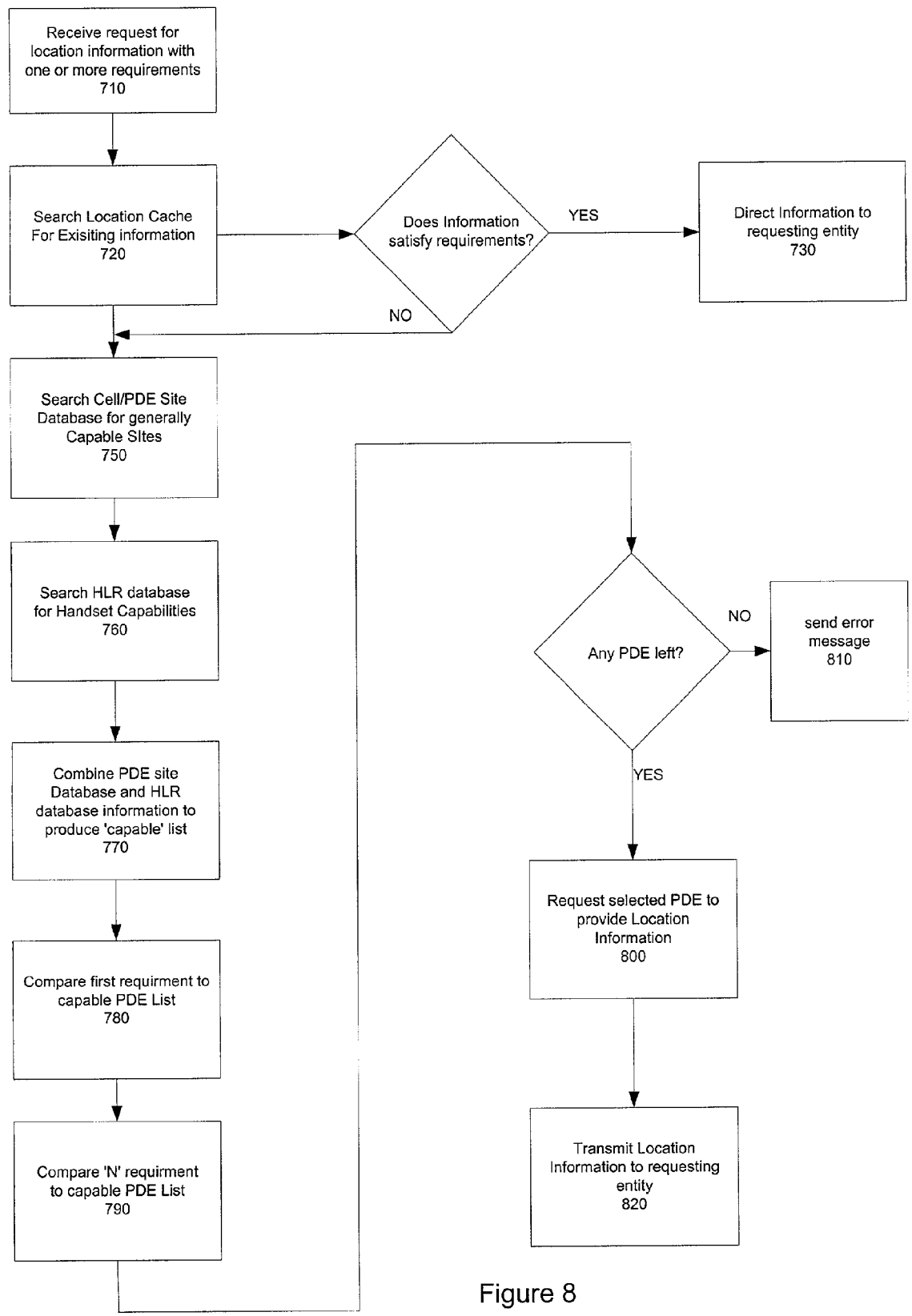
FIG. 8 illustrates an embodiment of a location information management protocol that may be utilized by the location information management system of FIG. 1.

Another function provided by the Location Information Management System 58 is to manage requests for location information for Mobile Communications Units 54 of the mobile communications system 10. Although these requests will typically be transmitted by a location based application 54 which generally interfaces with the Location Information Management System 58 through interface 60, the illustrated system 58 contemplates providing location information for Mobile Communications Units 14 to any authorized party which requests location information for a given Mobile Communications Unit 14, directly or indirectly, from the Location Information Management System 58. FIG. 8 presents one embodiment of location information management protocol 700 which may be utilized by the Location Information Management System 58 of FIGS. 1 and 3 for selecting a PDE site 46 to provide location information for a particular Mobile Communications Unit 14 when a general location is provided. The Location Information Management System 58 may include at least one processor 150 in this regard for executing the functionality of the protocol 700. However, any way of appropriately executing the protocol 700 in the context of the mobile communication system 10 may be utilized.

The illustrated protocol 700 of FIG. 8 is initiated by receiving (710) a request at the Location Information Management System for location information for a particular Mobile Communications Unit. This request for location information may originate from one of the location based applications 54 or from any source that properly interfaces with the Location Information Management System 58. This request may include one or more requirements or specifications that are associated with the desired location information to be provided by the Location Information Management System 58. In accordance with the present invention, some of these specifications may be in the form of a predefined user selectable ranges of QoS parameters e.g., low, medium, high accuracy. For exemplary purposes, the illustrated protocol implementation assumes that two QoS parameters have been received with the location request, such as a geographical accuracy parameter and time of response requirement.

The location information management protocol 700 of FIG. 8 continues searching (720) a location cache 160 associated with the Location Information Management System 558 to determine if the cache 160 includes location information satisfying the requirements of the request. The illustrated location cache 160 contains a record on each Mobile Communications Unit 14 within the mobile communication system 10. This record includes information on the last known physical location of the corresponding Mobile Communications Unit as well as a time associated with this last known physical location. This information may be acquired from, for example, a previous location request or through a home location register associated with the Mobile Communications Unit 14. The Location Information Management System 58 searches the location cache 160 to identify the relevant record 165 using for example the Mobile Communications Unit's mobile identification number (MIN). If the information in the record 165 meets all the requirements specified in the request, the information is retrieved from the location cache and directed (730) to the recipient designated by/in the request. In the event that satisfactory location information for a particular Mobile Communications Unit 14 is not currently stored in the location cache 160, the general location of the Mobile Communications Unit, if available, is accessed from the request or otherwise obtained and, if necessary, processed to be in a standard format for use with the Location Information Management System 58.

Once a general location of the Mobile Communications Unit 14 is known, the processor 150 associated with the Location Information Management System 58 uses the general location information such as a cell sector to search (750) the Cell/PDE database 72 to determine if any local PDE sites 50 are capable of providing location information for the Mobile Communications Unit 14 identified in the request. Generally, the database 72 is searched to produce a 'list' of identifiers associated with the PDE sites 50 capable of providing location information for an area that includes at least part of and, more preferably, encompasses the entirety of, the general location of the Mobile Communications Unit 14. Once these PDE identifiers are obtained, they may be used to search records 66 in the PDE site database 62 to identify one or more a PDE sites that can provide the location information.

The illustrated protocol then proceeds by determining if the Mobile Communications Unit 14 is associated with a handset-based position determining equipment site 46. In this instance, the processor 150 associated with Location Information Management System 58 will search (760) a Mobile Communications Unit database 100 which may be a HLR database for a particular Mobile Communications Unit 14 to determine what capabilities are available for the desired Mobile Communications Unit 14. In this regard, if a particular Mobile Communications Unit 14 supports, for example, TDOA position determination but not GPS, the available PDE 50 is correlated with this data and those PDEs which are handset-based, as noted by field 96, that are not supported by the Mobile Communications Unit 14 will be eliminated from consideration.

At this point, all PDE sites 50 capable of providing location information for the Mobile Communications Unit 14 are identified by combining (770) information from the PDE site database and the HLR database in a 'list'. Next, the one or more QoS parameters from the location information request may be compared (780–790) to the list of capable PDE sites to select a site for providing the desired information according to the specified parameters. For example, in the case where the first QoS parameter specifies a "medium" geographical accuracy, the processor 150 will begin to search the records associated with each listed PDE site 50 to determine if they provide at least medium geographical location information. As will be appreciated, at some point prior to initiation of the protocol 700, the ranges associated with each specification (geographical accuracy, cost, timeliness, etc.) will have been defined. For example, a location request may be provided via interface 60 from a location based application 54 requesting medium geographical accuracy. The Location Information Management System 50 may then convert this specification into a standard format that may be used in accordance with the present invention. For example, in the case of geographical accuracy, the Location Information Management System 58 may be configured such that low accuracy corresponds with an uncertainty of 750 meters or more, medium accuracy is location information with an accuracy between 300 and 750 meters and high geographical accuracy is defined as location information within a 300 meter radius. Accordingly, the protocol compares (780) the first parameter (e.g., medium geographical accuracy) with the corresponding attribute, which is expressed in standard terms, for each PDE site 50. In particular, the database records for each of the identified PDE sites 50 on the list is compared with the parameter. In the case of a parameter requesting medium geographical accuracy, all PDEs which provide high or low geographical accuracy are eliminated from consideration for selection (high accuracy PDEs may also be eliminated depending on the specific implementation of the protocol, e.g., the protocol may allow for specification of "at least medium" or "only medium". As will be appreciated, the interface 60 and Location Information Management System 58 may be configured such that any QoS parameter may be assigned a standardized value with and compared to any value in PDE database record 66. For example, low, medium and high geographical accuracies may be correlated with PDE types (i.e., low=cell sector, medium=TDOA, and high=AGPS) and then correlated with the position determination technology type 74 of the database record 66. As will be appreciated, this arrangement provides great flexibility in comparing QoS attributes with PDE capabilities and allows for changes in system capabilities to be implemented without necessarily changing the QoS parameters used by the location based applications.

If the location request contains a second specification the protocol proceeds to perform an appropriate comparison (790), again limiting the number of PDE sites 50 available to provide the desired location information. Once all such limiting steps of the protocol are completed, a PDE site 50 is selected and invoked (800) to provide the desired location information. It may, of course, turn out that multiple PDE sites 50 will be appropriate for determining the physical location of the Mobile Communications Unit 14. In this case, the Location Information Management System 58 may be configured such that it invokes all identified PDE sites 50 or invokes some sort of default selection criteria to select among the remaining PDE 46 sites. For example, the attributes listed in each PDE's record 56 in the PDE site database 62 may be utilized to select among the remaining PDE sites 50. Thus, in the case where three PDEs are identified as meeting the specifications from the location request, it may be possible to select among the three using a nonspecified attribute such as cost or any other attribute not already specified in the request. Alternatively, a client profile database may be consulted to determine default characteristics for individual clients. Thus, a client application may specify the use of a given PDE (e.g., due to a favorable relationship with that provider) whenever possible.

It, of course, may also turn out that none of the PDE sites 50 or other PDE sources will be appropriate for determining the physical location of Mobile Communications Unit 14. In this case, an error message may be sent (810) by the Location Information Management System 58 that provides an indication to the requesting entity that no location information is available for the Mobile Communications Unit 14 in accordance with the specified parameters.

Once a PDE site 50 is selected, the Location Information Management System 58 can transmit an invoke message to the PDE site 50 or the PDE system 46 to have the selected PDE site or system obtain and return to the Location Information Management System 58 location information for the specified Mobile Communications Unit 14. Once the Location Information Management System 58 receives the location information, it is translated to a standard form as defined by the interface and transmitted (820) to the requesting entity or other specified location.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention as defined by the following claims.

What is claimed is:

1. A method for use in providing location information regarding mobile units in a mobile communications system, said method comprising the steps of:
   receiving a request for location information for a first Mobile unit, said request identifying said first mobile unit and further including at least a first specification regarding a quality of said requested location information;
   correlating said first specification with at least one attribute stored in a PDE site database;
   based on said correlating step, selecting at least one location information source capable of providing responsive location information for said first mobile unit;
   obtaining said responsive location information from said selected location information source, wherein said responsive information at least substantially conforms to said first specification regarding said quality of said requested location information; and
   providing said responsive location information to a selected location based on said request.

2. The method of claim 1, wherein said step of selecting further comprises selecting at least one location information source from a plurality of location information sources operable to provide said responsive location information.

3. The method of claim 2, wherein said plurality of location information sources comprises one of a database containing responsive location information and equipment associated with the mobile communications system operable to obtain responsive location information.

4. The method of claim 2, wherein said step of selecting further comprises utilizing a default specification to select between multiple acceptable location sources, where each of said multiple acceptable location sources is capable of obtaining location information at least substantially conforming to said first specification.

5. The method of claim 1, wherein said step of obtaining further comprises invoking said selected location information source to provide said responsive location information.

6. The method of claim 1, wherein:
   said specification establishes a priority for selecting said location information source to provide responsive location information for a particular request.

7. The method of claim 6, wherein said priority is established by a last in first out command.

8. The method of claim 1, wherein
   said specification specifies a particular type of location information source for use in providing said responsive location information.

9. The method of claim 1, wherein:
   said specification regarding a quality of said requested location information is related to a geographical accuracy for said responsive location information.

10. The method of claim 1, wherein:
    said specification regarding a quality of said requested location information is related to an acceptable cost associated with said responsive location information.

11. The method of claim 1, wherein:
    said specification regarding a quality of said requested location information is related to an allowable age of said responsive location information.

12. The method of claim 1, wherein:
    said specification regarding a quality of said requested location information is related to acceptable response times to provide said responsive location information.

13. The method of claim 1, wherein said receiving step further comprises correlating said specification to a corresponding value associated with said location information sources.

14. The method of claim 13, wherein said correlating step involves correlating said specification to an average value associated a plurality of location information sources.

15. The method of claim 13, wherein said correlating step involves correlating said specification to a first value associated with an individual location information source.

16. The method of claim 1, wherein said selecting step comprises consulting at least a first database in which information associated with said location information sources is stored.

17. The method of claim 1, wherein said selecting step further comprises consulting at least a first database in which information regarding location determining abilities of said position location information sources are stored such that only location information sources capable of providing said responsive location information are selected.

18. The method of claim 1, further comprising:
    correlating said first specification with at least one attribute stored in a home location register database.

19. A method for use in providing location information regarding mobile units in a mobile communications system, said method comprising:

receiving a request for location information for a first Mobile unit, said request identifying said first mobile unit and further including at least a first specification regarding a quality of said requested location information;

receiving a first indication of the general location of said first mobile unit;

based on said first specification and said first indication of the general location, selecting at least one location information source in a proximity of said mobile unit capable of providing responsive location information for said first mobile unit;

obtaining said responsive location information from said selected location information source, wherein said responsive information at least substantially conforms to said first specification regarding said quality of said requested location information; and providing said responsive location information to a selected location based on said request.

20. The method of claim 19, wherein said first indication of the general location of said mobile unit is a standard identifier utilized by said mobile communications system.

21. The method of claim 20, wherein said standard identifier comprises at least one of a cell identifier and a cell sector identifier utilized by said mobile communications system.

22. A method for use in providing location information regarding mobile units in a mobile communications system, said method comprising the steps:

receiving a request for requested location information for a first mobile unit;

obtaining information regarding a general location of said first mobile communication unit;

based on said general location of said first mobile unit, identifying at least first and second sources operable to provide responsive location information regarding said first mobile unit in said general location;

selecting one of said first and second sources to provide said responsive location information;

obtaining said responsive location information from said selected location information source; and providing said responsive location information to a selected location based on said request.

23. The method of claim 22, further comprising the steps of:

receiving at least one specification regarding a quality of said location information in said request; and using said specification in said selecting step to select at least one of said first and second sources to provide responsive location information.

24. The method of claim 22, wherein said information regarding the general location of said mobile unit is a standard identifier utilized by said mobile communications system.

25. The method of claim 24, wherein said standard identifier comprises at least one of a cell identifier and a cell sector identifier utilized by said mobile communications system.

26. The method of claim 22, wherein said step of identifying at least first and second information sources operable to provide responsive location information includes the step of utilizing said general location information for searching a database to determine location information sources operable to provide responsive location information.

27. The method of claim 22, wherein said step of identifying at least first and second information sources operable to provide responsive location information includes the step of searching a database for existing location information regarding said first Mobile unit that is responsive to said request.

28. A method for use in providing location information regarding mobile units in a mobile communications system, said method comprising the steps:

establishing an interface allowing an application to provide requests for location information regarding a first mobile unit from a location platform, said interface defining a number of information fields that may be included in said requests;

receiving a first request for location information at said platform via said interface, wherein said first request includes at least one specification regarding a quality of said requested location information, said specification being included in one of said information fields;

comparing said specification to at least one attribute contained in a PDE database;

based on said comparing step, obtaining responsive location information regarding said first mobile unit; and providing said responsive location information to a selected location based on said request.

29. The method of claim 28, wherein said step of establishing an interface comprises defining a number of messages that are useable by a user to selectively request location information for said mobile unit.

30. The method of claim 28, wherein said plurality of information fields includes a field for use in specifying at least one of a priority of said request, a geographical accuracy of said location information, a cost associated with said location information, an age of said information and a response time for said location information.

31. The method of claim 28, wherein said step of obtaining comprises identifying at least first and second information sources operable to provide responsive location information.

32. The method of claim 28, wherein said step of obtaining includes searching at least a first database for existing location information that is responsive to said request.

33. The method of claim 28, wherein said step of obtaining includes accessing at least a first database to correlate capabilities of location information sources in the mobile communications system with said specification.

34. An apparatus for providing location information regarding mobile units in a mobile communications system, said apparatus comprising:

a processing system in communication with a plurality of location information sources associated with said mobile communications system and at least one application for implementing at least one function based on mobile unit location;

portal logic, supported by said processing system, for receiving location information requests regarding at least a first mobile unit, wherein said portal logic is operable to receive a first location request containing one or more specifications regarding a quality of said location information;

selection logic, supported by said processing system, for identifying and selecting at least one of said location information sources operable to provide responsive location information based on a correlation between a PDE database and said one or more specifications;

retrieval logic, supported by said processing system, for obtaining said responsive location information from said selected location information source; and said portal logic further operable to provide said responsive location information to a location based on said first request.

35. The apparatus of claim 34, wherein said portal logic is further operative to obtain a first indication of the general location of said first mobile unit from said location request.

36. The apparatus of claim 35, wherein said selection logic is further operable to utilize said general location of said first Mobile unit in said identifying and selecting said location information sources operable to provide said responsive location information.

37. The apparatus of claim 36, wherein said selection logic is operable to access one or more of databases to provide said responsive location information.

38. The apparatus of claim 37, wherein said selection logic is operable to utilize said general location information to search said one or more databases.

39. The apparatus of claim 35, wherein said said PDE database comprises a database containing location information capabilities for location information sources associated with said mobile communications system.

40. The apparatus of claim 35, wherein said processing system comprises a location cache operable to store location information for Mobile units operating in the mobile communication system.

41. The apparatus of claim 35, wherein said processing system comprises a home location register database associated with said mobile unit.

42. The apparatus of claim 34, wherein said portal logic defines a number of information fields for standardizing location communications between said processing system and said application.

* * * * *